May 20, 1952  H. L. CHISHOLM, JR  2,596,982
FOOT VALVE STRUCTURE FOR TELESCOPIC SHOCK ABSORBERS
Filed March 26, 1947  2 SHEETS—SHEET 1
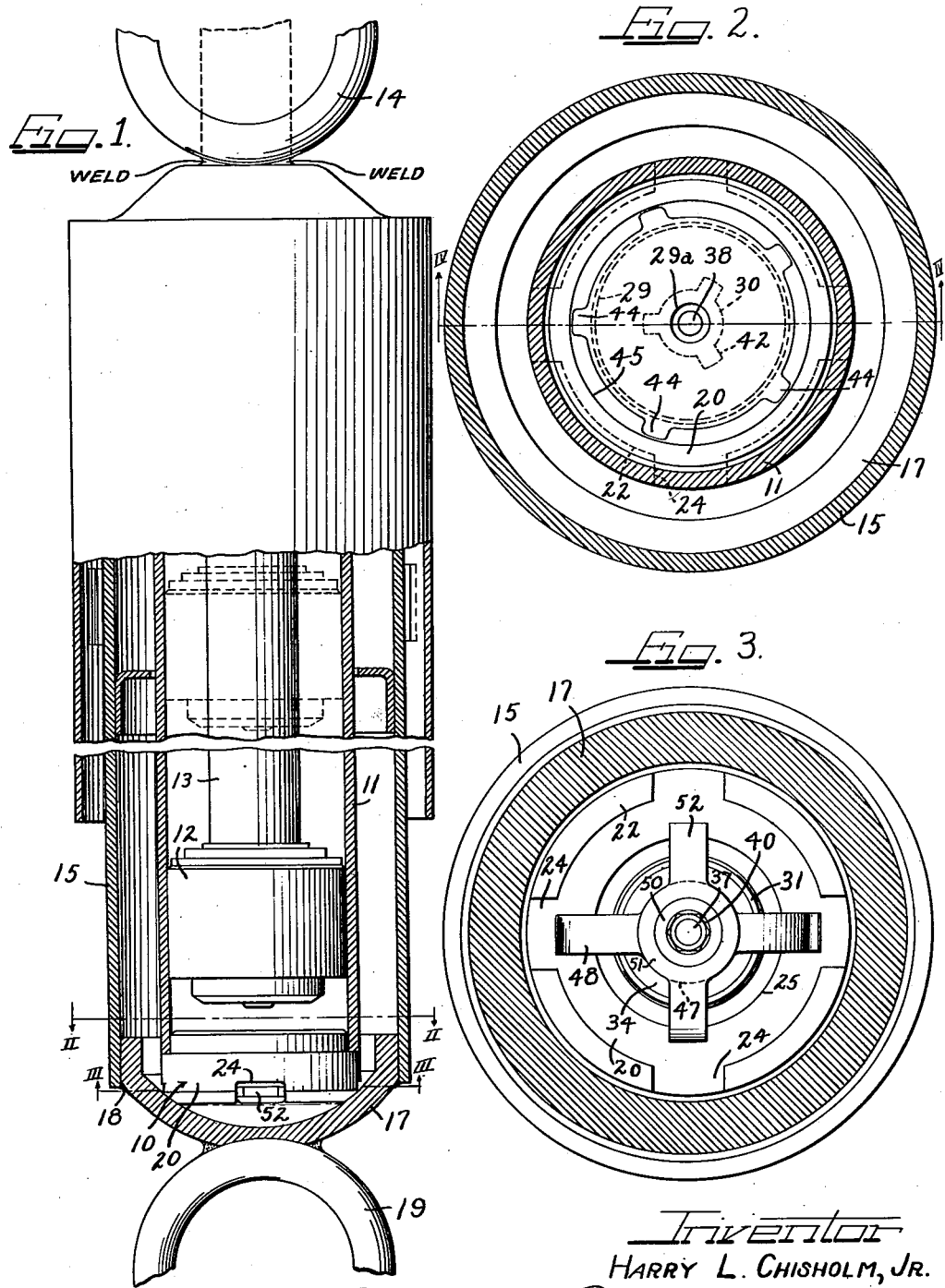
Inventor
HARRY L. CHISHOLM, JR.

May 20, 1952  H. L. CHISHOLM, JR  2,596,982
FOOT VALVE STRUCTURE FOR TELESCOPIC SHOCK ABSORBERS
Filed March 26, 1947  2 SHEETS—SHEET 2

Inventor
HARRY L. CHISHOLM, JR.

Patented May 20, 1952

2,596,982

UNITED STATES PATENT OFFICE 2,596,982

FOOT VALVE STRUCTURE FOR TELESCOPIC SHOCK ABSORBERS

Harry L. Chisholm, Jr., Buffalo, N. Y., assignor to Houdaille-Hershey Corporation, Detroit, Mich., a corporation of Michigan Application March 26, 1947, Serial No. 737,362

9 Claims. (Cl. 277—45)

This invention relates to improvements in telescopic shock absorbers and more particularly relates to a new and improved foot valve structure therefor.

In direct acting or telescopic shock absorbers wherein a piston is hydraulically resisted in its reciprocal movements in a cylinder, which communicates with a concentrically encircling reserve chamber or reservoir to accommodate hydraulic fluid displaced by the piston rod, a valve structure is customarily provided between the cylinder and the reservoir to control the displacement and replenishment of the hydraulic fluid therebetween. Such a valve structure is often referred to as a "foot valve."

Since the foot valve is on the end of the cylinder which is opposite the low pressure side of the piston, the construction and arrangement of the valve structure must be such as to restrain the displacement of the hydraulic fluid into the reservoir with a degree of resistance properly coordinated with the fluid displacement past the piston to the high pressure side thereof during the compression stroke of the piston, otherwise the high pressure side will not be adequately filled and the shock absorber will not function properly on rebound stroke. This presents substantial problems with respect to orifice size, blowoff resistance, operational variations due to differences in viscosity of the fluid at different temperatures, and the like. In addition, the valve structure must be such as to operate freely for replenishment during the rebound stroke. With all this, the structural components must be simple, sturdy and inexpensive to manufacture and assemble.

An important object of the present invention is to provide a new and improved foot valve structure for direct acting shock absorbers which will satisfactorily meet the foregoing requirements.

Another object of the invention is to provide an improved valve structure for direct acting shock absorbers which is susceptible of especially desirable correlation of the compression blowoff valve area with the piston valve area for optimum results in operation.

A further object of the invention is to provide in a foot valve structure for direct acting shock absorbers an improved compression blowoff valve assembly in which a substantially improved resistance balance is adapted to be attained with relation to piston operation.

Other objects, features and advantages of the present invention will be readily apparent from the following detailed description of a preferred embodiment thereof taken in conjunction with the accompanying two sheets of drawings, in which:

Figure 1 is a fragmental elevational view, partly in section, of a direct acting shock absorber embodying the features of the present invention;

Figure 2 is an enlarged transverse sectional view taken substantially along the line II—II of Figure 1;

Figure 3 is an enlarged transverse sectional view taken substantially along the line III—III of Figure 1;

Figure 4:
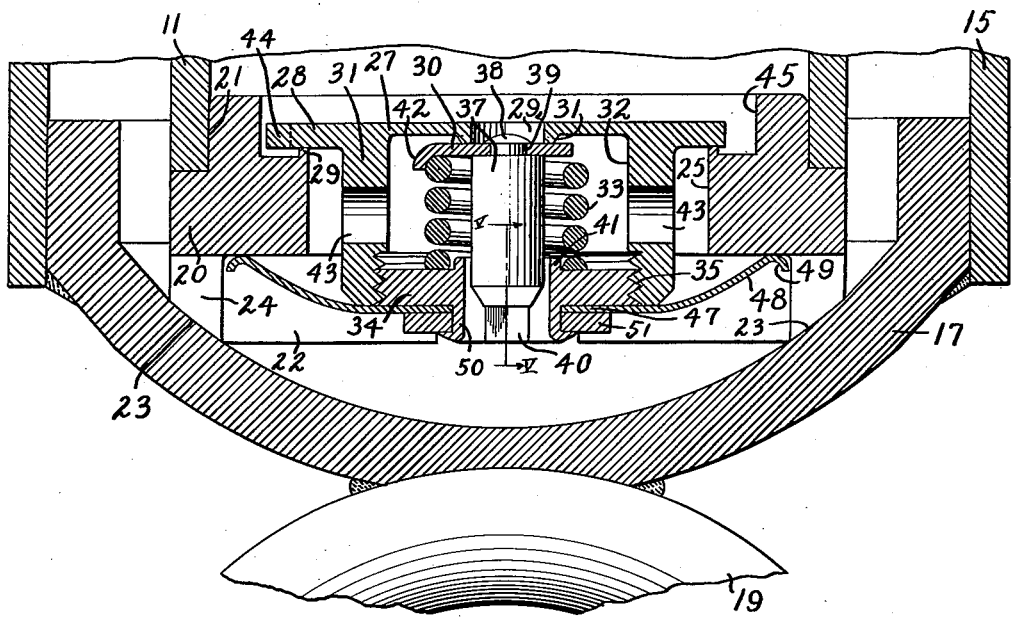
Figure 4 is a substantially enlarged diametrical sectional view taken substantially on the line IV—IV of Figure 2.

A foot valve structure 10 embodying the present invention is adapted to be employed in a direct acting shock absorber comprising a cylinder 11 within which is operable a piston 12 of any preferred construction and compression blowoff and rebound blowoff arrangement. The piston 12 is carried by a piston rod 13 which extends beyond one end of the cylinder 11 and carries a connecting eye 14 by which it is adapted to be secured to the sprung portion of a vehicle, such as an automobile.

Surrounding the cylinder 11 in concentric spaced relation is a reserve chamber or reservoir tube 15 which at the piston rod end of the shock absorber unit is appropriately connected with the cylinder 11 in a manner which it has not been deemed necessary to show, since that is a matter of preference, as is known in the art. At the opposite end, the tube 15 has secured thereto a closure cup 17 which may be welded thereto in assembly as indicated at 18, and which carries means such as an attachment eye 19 by which the shock absorber unit may be attached to the unsprung portion of the vehicle.

The foot valve structure 10 is interposed between the end of the cylinder 11 and the closure member 17 and for this purpose comprises an annular valve cage body member 20 which is formed with a rabbet groove 21 by which it is interfitted with the end of the cylinder 11 in substantially fluid tight relation. Opposite the rabbet groove 21 the valve cage body 20 is formed with a spacer flange 22 which preferably has the edge thereof formed complementary to the opposing internal contour of the closure member 17 so as to seat firmly thereagainst, as shown at 23, by the clamping action of the cylinder 11 axially against the valve cage member. The diameter of the valve cage body 20 is preferably less than that of the cylindrical wall of the closure cup 17 similarly as the diameter of the cylinder 11 so as to afford a clearance to the reservoir space between the cylinder 11 and the reservoir tube 15. Radial slots 24 in the flange 22 herein shown as four in number, and equidistantly spaced, afford passageways between the space below the valve cage body 20 and the reservoir space.

For displacement of hydraulic fluid through the valve cage body 20 it is formed with a relatively large axial bore 25 which is normally closed by an inverted cup shaped valve member 27 formed with a radial head flange 28 resting upon a narrow annular valve seat edge 29 formed about the upper end of the bore 25. The primary function of the valve member 27 is to close the bore 25 against compression displacement of hydraulic fluid from the low pressure side of the piston or low pressure chamber of the cylinder and to permit ready replenishment flow of the hydraulic fluid through the bore 25 to the low pressure chamber. To this end, the valve member 27 is provided with auxiliary valve means effectively preventing compression displacement of the hydraulic fluid up to a predetermined pressure whereupon compression blowoff is permitted through an axial orifice 29a of predetermined relatively small size controlled by a compression blowoff valve 30.

By preference the compression blowoff valve 30 is in the form of a disk bearing against a limited contact downwardly extending narrow valve seat lip 31 about the orifice 29a on the underside of the head of the valve member 27.

In the present instance the valve member 27 provides a blowoff valve cage comprising an integral annular depending skirt 31 of substantially smaller external diameter than the bore 25 in the valve body 20 and providing a chamber 32 therein within which the valve 30 is housed.

Means for holding the valve 30 on its seat with predetermined pressure comprises a coiled compression spring 33 which bears against the under side of the valve disk 30 and at its opposite end against an abutment member 34. The latter is preferably in the form of a disk threaded into the lower end portion of the skirt 31, as indicated at 35.

In order to hold the compression blowoff valve 30 against canting or chattering during operation it is preferably guided for substantially straight reciprocal movement by a guide stem or pin 37 which may be provided with a reduced diameter head portion or terminal 38 extending through an axial aperture 39 in the valve disk and upset rivet-fashion to secure the guide pin to the valve disk.

At its lower end, the valve guide pin 37 extends through a guide bore 40 in the abutment member 34. By preference the guide bore 40 is formed to limit contact with the guide pin 37 and thus avoids sticking. This may be conveniently effected by having the pin cylindrical and the guide bore 40 angular in cross-section such as hexagonal, as best seen in Fig. 3. Thereby the guide pin is uniformly guided but contact with the wall of the guide bore 40 is limited to longitudinal lines of contact with ample relief spaces between the lines of contact as is clearly evident in Fig. 4.

In order to hold the spring 23 concentric, the upper side of the abutment member 34 about the guide bore 40 may be formed with a concentric guide flange 41. For the same purpose the valve disk 30 is formed with radially extending retaining arms 42 which are bent down to engage the upper coil of the spring 33 and hold the same against lateral displacement relative to the valve disk.

Escape of compression displacement fluid from within the chamber 32 is provided for through radial ports 43 through the skirt 31.

In order to hold the valve member 28 with the skirt 31 substantially concentric within the bore 25 and afford free and unrestrained passage entirely about the skirt 31, the radial flange 28 is preferably formed with a plurality of radially extending, annularly spaced retaining lugs or fingers 44 (Fig. 2) and the valve body member 20 is formed with an annular cylindrical guide surface 45 of slightly greater diameter than the diameter of a circle described about the ends of the guide fingers 44. This arrangement also assures free flow of replenishment hydraulic fluid past the valve member 27 from the bore 25.

For normally holding the valve member 27 to its seat 29, a relatively weak spring 47 is provided which is in the form of a spring disk engaging the bottom side of the abutment member 24 and having a pair of diametrically oppositely extending spring arms 48 which are preferably bowed upwardly and formed at their extremities with curved sliding pads 49 engaging the underside of the valve cage member 20. The spring disk member 47 is centrally apertured to fit about a small diameter, downwardly extending concentric attachment flange 50 on the abutment member 34 and which is upset or spun over at its lower end to engage a washer-like member 51 and retainingly clamp the same against the spring disk 47.

Figure 5:
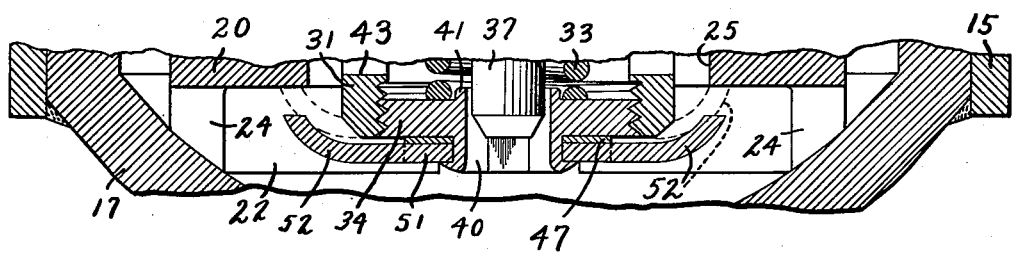
Figure 5 is a vertical sectional view taken substantially on the line V—V of Figure 4.

The washer-like member 51 is formed with a pair of diametrically oppositely extending limit arms 52 (Fig. 5) which are curved upwardly at their extremities. The arms 52 are of a length and form to limit unseating movement of the valve 27 in the replenishment flow of hydraulic fluid thereby, as permitted by the spring 48, during the rebound stroke of the piston, substantially as shown in a broken outline in Fig. 5.

It will thus be seen that during the compression stroke of the piston 12 hydraulic fluid will be displaced from the low pressure chamber within the cylinder 11 only when the pressure of the hydraulic fluid attains a value great enough to overcome the predetermined loading or tension of the blowoff valve spring 33.

By having the blowoff orifice 29a communicating directly with the face of the valve disk 30, full pressure is exerted against the blowoff valve disk throughout the predetermined area of the orifice but to no greater extent. Accordingly, the strength of the spring 33 can be fairly closely calculated and need not be excessively strong. Furthermore, the tension of the spring 33 can be adjusted for optimum results by the extent to which the abutment member 34 is threaded into the skirt 31.

It will, of course, be understood that various details of construction may be varied through a wide range without departing from the principles of this invention and it is, therefore, not the purpose to limit the patent granted hereon otherwise than necessitated by the scope of the appended claims.

As to certain generic subject matter reference is made to my copending application, Serial No. 202,976, filed December 27, 1950, containing generic claims.

I claim as my invention:

1. In combination in a foot valve construction, a valve cage body having a port therethrough of substantial diameter, a valve member normally closing said port and having a skirt portion of smaller diameter than said port extending therethrough, an orifice through said valve member to the interior of said skirt, a valve element within the chamber provided by said skirt normally closing said orifice, abutment means carried by the inner end portion of said skirt, a compression spring engaging said abutment means and said orifice-closing valve element, and means for controlling the port-opening movement of the valve member including arms projecting laterally beyond said skirt and opposing an oppositely directed stationary portion of said cage body.

2. In combination in a foot valve construction, a valve cage body having a port therethrough of substantial diameter, a valve member normally closing said port and having a skirt portion of smaller diameter than said port extending therethrough, an orifice through said valve member to the interior of said skirt, a valve element within the chamber provided by such skirt normally closing said orifice, an abutment member carried by the inner end portion of said skirt, and a compression spring engaging said abutment member and said orifice closing valve element, said orifice closing-valve element having a depending stem and said abutment member having a portion guidingly engaging said stem for axial reciprocation of the stem with the orifice closing valve element.

3. In combination in a valve structure of the character described, a disk type valve member having a skirt of smaller diameter extending from one side thereof, an orifice through said valve member to the interior of the skirt, a valve element interiorly of the skirt and adapted for closing said orifice, means within and carried by the skirt for normally holding the orifice closing valve element seated and means projecting laterally substantially from said skirt and adapted to oppose in valve movement limiting relation a stationary structure with which the valve member may be used.

4. In combination in a valve construction of the character described, a cylindrical hollow valve member having a lateral valve flange at one end and a central orifice therethrough, a valve element within said member for closing said orifice, an abutment member threadably engaging within the opposite end of the valve member, a compression spring extending between said abutment member and said valve element for normally holding the valve element closed, a pair of valve movement restraining spring arms carried by said abutment member and projecting laterally from said valve member, and a pair of valve movement limiting arms carried by said abutment member and extending laterally from said valve member angularly relative to said spring arms.

5. In combination in a valve construction of the character described, a cylindrical hollow valve member having a lateral valve flange at one end and a central orifice therethrough, a valve element within said member for closing said orifice, an abutment member threadably engaging within the opposite end of the valve member, and a compression spring extending between said abutment member and said valve element for normally holding the valve element closed, said abutment member having an axial aperture therethrough coaxial with said orifice, and said valve element having a guide stem extending through said aperture.

6. In combination in a valve structure of the character described, an annular disk-like valve member having a skirt of smaller diameter extending from one side thereof, an orifice through said valve member opening into the chamber provided by the skirt, a closure plug threaded into the end of the skirt, said closure plug having an opening therethrough concentric with the orifice, a valve element for closing said orifice and having a guide stem projecting into said closure plug opening, and a compression spring encircling said stem in spaced relation and abutting said closure plug and said valve element.

7. In combination in a valve structure of the character described, an annular disk-like valve member having a skirt of smaller diameter extending from one side thereof, an orifice through said valve member opening into the chamber provided by the skirt, a closure plug threaded into the end of the skirt, said closure plug having an opening therethrough concentric with the orifice, a valve element for closing said orifice and having a stem projecting into said closure plug opening for reciprocal guided movement therein, and a compression spring encircling said stem in spaced relation and abutting said closure plug and said valve element, said closure plug carrying spring arms projecting laterally therefrom and adapted for holding the disk-like valve member seated.

8. In combination in a valve structure of the character described, an annular disk-like valve member having a skirt of smaller diameter extending from one side thereof, an orifice through said valve member opening into the chamber provided by the skirt, a closure plug threaded into the end of the skirt, said closure plug having an opening therethrough concentric with the orifice, a valve element for closing said orifice and having a guide stem projecting into said closure plug opening for reciprocal sliding therein, and a compression spring encircling said stem in spaced relation and abutting said closure plug and said valve element, said closure plug carrying spring arms projecting laterally therefrom and adapted for holding the disk-like valve member seated, said closure plug carrying limit arms projecting radially and adapted to restrain the valve member against more than predetermined lifting from its seat.

9. In combination in a foot valve assembly adapted to be secured between a cylinder and a reservoir, a valve cage body having a central bore of substantial diameter, a disk-like valve member seated in closing relation to said bore for preventing compression displacement of hydraulic fluid from the cylinder, an orifice through said valve member, a skirt depending from said valve member concentrically about the orifice, a closure plug secured in the lower end of the skirt, openings from the skirt for fluid passage, a valve element within the chamber provided by the skirt, resilient means supported by the closure plug and normally holding the valve member in closing relation to said orifice, spring arms carried by said closure plug and extending laterally beyond the lower end of the skirt bore engaging the under side of said valve cage body to restrain the valve member mildly against leaving its seat, and abutment arms extending from said closure plug beyond the lower end of the skirt for limiting the unseating movement of the valve member.

HARRY L. CHISHOLM, JR.

REFERENCES CITED

The following references are of record in the file of this patent:

UNITED STATES PATENTS

| Number | Name | Date |
|---|---|---|
| 1,758,671 | Loughstead | May 13, 1930 |
| 1,835,110 | Bates | Dec. 8, 1931 |
| 1,942,313 | Viele | Jan. 2, 1934 |
| 2,148,839 | Rossman | Feb. 28, 1939 |